Oct. 1, 1968 H. E. HENSCHEN 3,404,367

DISENGAGEABLE ELECTRICAL CONNECTIONS

Filed June 20, 1966 7 Sheets-Sheet 1

DISENGAGEABLE ELECTRICAL CONNECTIONS

Filed June 20, 1966

Oct. 1, 1968 H. E. HENSCHEN 3,404,367

DISENGAGEABLE ELECTRICAL CONNECTIONS

Filed June 20, 1966 7 Sheets-Sheet 4

United States Patent Office 3,404,367
Patented Oct. 1, 1968

3,404,367
DISENGAGEABLE ELECTRICAL CONNECTIONS
Homer Ernst Henschen, Carlisle, Pa., assignor to AMP Incorporated, Harrisburg, Pa.
Filed June 20, 1966, Ser. No. 558,955
6 Claims. (Cl. 339—217)

ABSTRACT OF THE DISCLOSURE

Electrical contact socket comprises two square frame sections, the corresponding sides of which are connected to each other by four semi-elliptic springs. Springs are inwardly concave relative to the socket axis and are adapted to engage an inserted contact pin. Retaining ears extend from each side of the free end of one of the frame sections and are adapted to lodge in an enlarged end of a housing cavity. These ears provide guiding means for the pin during insertion and retain the socket against movement through the cavity in one direction. Additional retaining means, in the form of a lance, is provided on other end adjacent to other frame section to prevent movement of the socket relative to the cavity in the opposite direction.

*Background of the invention*

This invention relates to contact terminals and to electrical interconnection systems.

An object of the invention is to provide an improved contact socket which can accommodate a wide range of contact pin sizes. A further object is to provide a contact socket which is particularly adapted to make electrical connections between printed circuit mother boards or base boards and printed circuit daughter boards. A still further object is to provide an interconnection system for printed circuit boards which permits alternative grid patterns for the locations of the contact pins which extend into the mother board. A further object is to provide a low cost contact socket which is relatively immune to damage as a result of careless or unskilled handling and which permits the achievement of relatively close center-to-center spacing in the connector block.

These and other objects of the invention are achieved in a preferred embodiment of a contact socket comprising a pair of axially aligned spaced-apart substantially square frame sections which are connected together by four semi-elliptic springs, each spring being integral at its end with a pair of corresponding sides of the frame sections. The springs are inwardly concave with respect to the axis of the socket and are flexed outwardly upon insertion of a contact pin and impose, by virtue of such flexure, the contact pressure on the inserted pin. A post member extends from one of the frame sections, this post member being parallel to, and beside, the axis of the socket. The connector block which is adapted to receive the pin has cavities which are adapted to receive contact sockets in any one of the four possible orientations, that is, with the posts disposed in any one of four positions which are spaced apart by 90° around the socket axis. By virtue of this arrangement, several alternative grid patterns of the posts can be achieved, for example, the posts may be equally spaced apart or each pair of adjacent posts may be spaced relatively close to each other with a maximum spacing between adjacent pairs of posts. The connector is intended to be mounted on a printed circuit board or mother board having conducting paths thereon. The spacing of the posts can thus be arranged in a manner which will result in maximum convenience for the circuit designer. The contact sockets are adapted to receive pins extending from an additional connector on which a printed circuit card or so-called daughter board is mounted.

In the drawing:

FIGURE 5 is a view similar to FIGURE 4 but showing the parts disengaged from each other;

Figure 1:
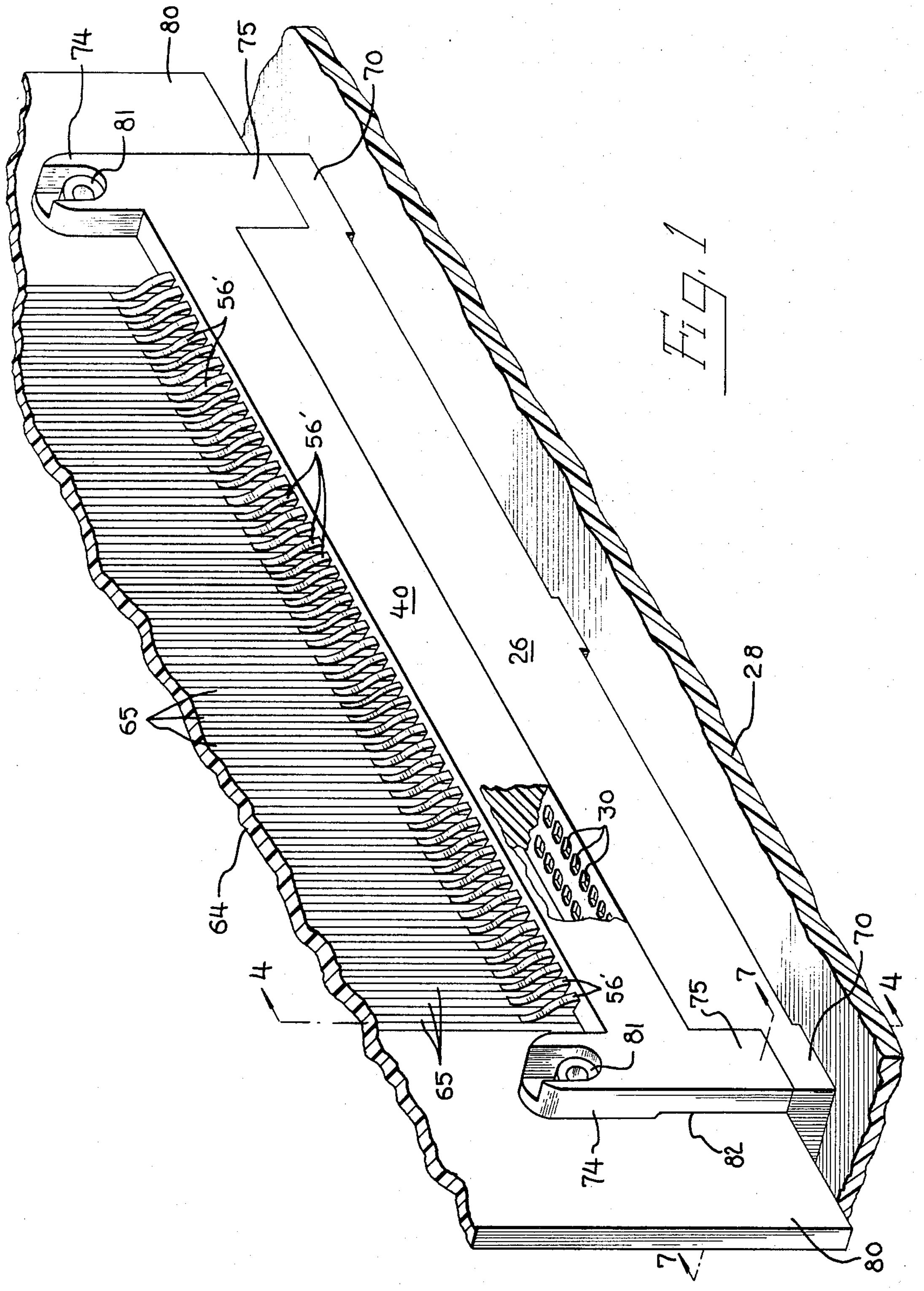
FIGURE 1 is a perspective view, with parts broken away, of an interconnection system in accordance with the invention which utilizes contact terminals in accordance with the invention.
Figure 3:
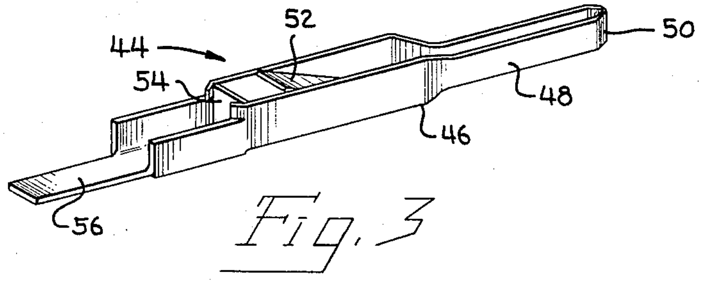
Figure 6:
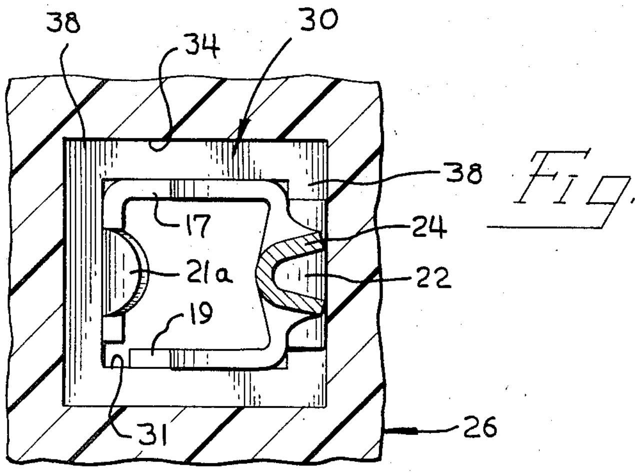
Figure 7:
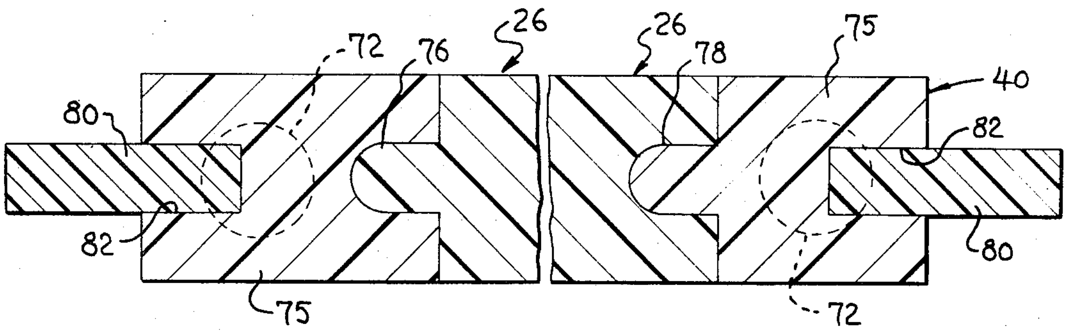
Figures 3, 4:
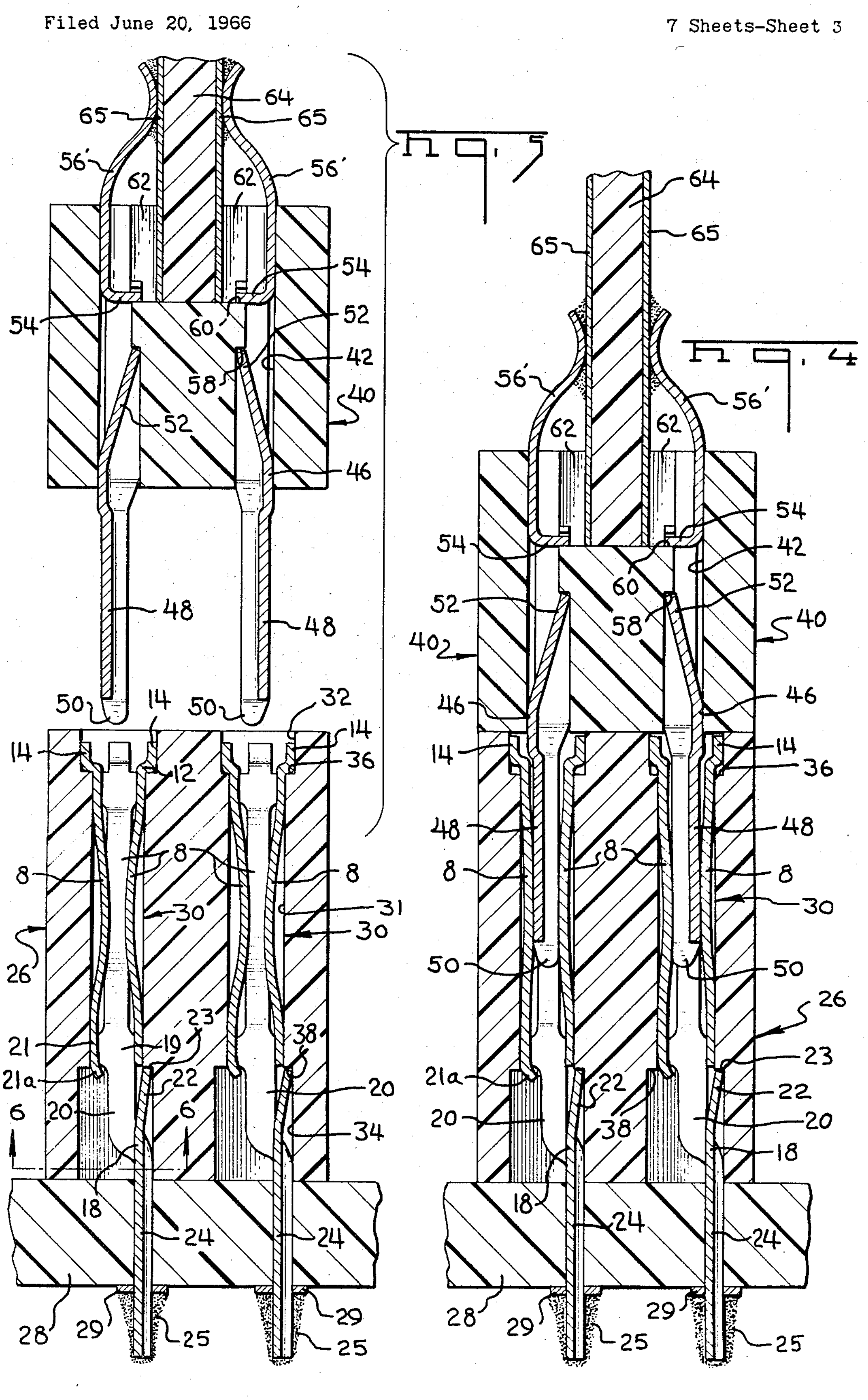
FIGURE 4 is a view taken along the lines 4—4 of FIGURE 1 showing the manner in which the contacts of FIGURES 2 and 3 are used to make connections between daughter boards and mother boards.

FIGURES 6 and 7 are views taken along the lines 6—6 of FIGURE 4 and 7—7 of FIGURE 1 respectively; and FIGURES 8, 9, 10, and 11 are schematic views showing a portion of the underside of the mother board and illustrating different grid patterns for terminal posts which can be achieved in the practice of the invention.

Figure 2:
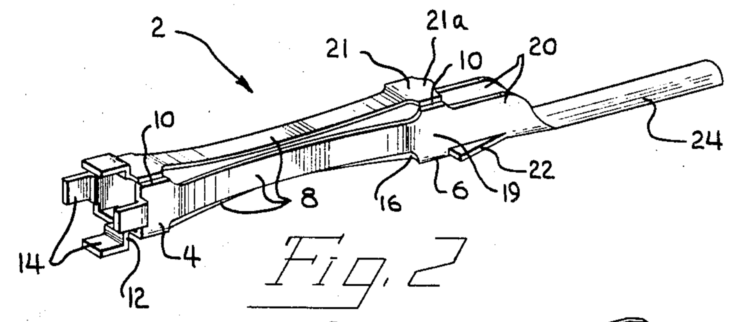
FIGURES 2 and 3 are perspective views of a socket and pin contact.

Referring first to FIGURE 2, a contact socket 2 in accordance with the invention has two spaced-apart substantially square end sections or frame sections 4, 6 which are connected to each other by semi-elliptic springs 8, each spring being integral with corresponding sides of the end sections. Sockets of this type are advantageously manufactured by die stamping and forming methods so that an open seam 10 remains in one of the corners of each of the end sections. The springs 8 are concave inwardly toward the axis of the socket but are capable of substantial deflection upon insertion of a contact pin so that a wide range of pin sizes can be accommodated by a given socket size. Laterally extending ears or flanges 12 are provided on the edges of the frame section 4, the end portions of these ears being bent as shown at 14 so that these end portions will extend substantially parallel to the socket axes.

One side 16 of the frame section 6 has an integral rearwardly extending web 18 from which side-walls 20 extend, these sidewalls forming continuations of the adjacent sides 17, 19 of the frame section 6. A retaining lance 22 struck out from the web 18 slopes divergently from the socket axis and has a free end 23 which is adjacent to frame section 6 for retaining the contact in a receptacle block. The web 18 merges with a generally U-shaped post 24 which is adapted to be inserted through a hole in a printed circuit mother board and soldered to conductors on the board. A lip or shoe **21*a* is provided on the side 21 of the frame section and extends rearwardly and slopes inwardly towards the socket axis. This shoe facilitates the insertion of the contact into a cavity as will be described below. The post portion 24** is offset with respect to the longitudinal axis of the socket, that is, it extends parallel to, and beside, the longitudinal axis. This construction permits the achievement of several different grid patterns of posts in a receptacle block as will be explained below. Alternatively, a plurality of such posts can be interconnected by clip-type wiring techniques or wire-wrapping techniques although a different form of post might be required for such alternative interconnection methods.

Posts of the type shown in FIGURE 1 are intended to be used in a receptacle block 26 (FIGURES 1, 4, and 5) having a multiplicity of relatively closely spaced cavities 30 extending therethrough. FIGURES 8–11 show the locations of such cavities in connector blocks. These views show the underside of a printed circuit mother board 28 on which two blocks **26*a*, 26*b* are mounted adjacent to each other. The cavities thus appear in phantom in these views. These cavities have a square cross-section, the intermediate portion 31 of which has substantially the same dimensions as the dimensions of the end sections 4, 6 of the contact, see FIGURE 4. The upper ends, as viewed in FIGURE 5, of the cavities are enlarged as shown at 32 for reception of ears 12, 14 on the end sections 4 of the contacts and the lower ends of the cavities are enlarged as shown at 34. The enlargements 34 extend inwardly in each cavity a distance sufficient to accommodate the lances 22 and the sidewalls 20. The contact sockets are inserted from the upper side, as viewed in FIGURE 5, until the ear portions 12 seat against the shoulders 36 and the lances 22 lodge against one of the shoulders 38. Since the enlargements 34 provide four shoulders which surround the axes of the cavities, the sockets 2 can be inserted in any one of four orientations. Because of the fact that the post portions 24** are offset with respect to the axis of the socket, alternative grid patterns in these posts can be achieved.

Because of the fact that the intermediate cavity portions 31 are narrower than the overall width of the contacts (between the posts 24 and the side 21 of the rear frame section 6), the contacts cannot be axially inserted into the cavities without deformation. The disclosed embodiment permits elastic flexure of the post portions 24 of the contacts and the springs 8 to permit insertion notwithstanding these apparently interfering dimensions. The frame section 6 and the adjoining web 18 and sidewalls 20 remain rigid during insertion while the post 24 and the springs 8 flex or bow to permit passage of the lower portion of the contact through the intermediate portion 31 of the cavity. The shoe **21*a* functions to guide the frame section 6 into the intermediate portion of the cavity 31 during insertion, particularly past the edge of the shoulder 32 with which it comes into contact. It should be noted that the high degree of flexibility possessed by the springs 8** thus permits the contacts to be inserted through the relatively constricted intermediate portions of the cavities and thereby permits the achievement of the offset post arrangement discussed above.

A variety of types of contact pins can be used with socket contacts 2 of the type shown in FIGURE 2 one suitable pin 44 being shown in FIGURE 3 to comprise an intermediate substantially U-shaped section 46 having a relatively flat web and a nose portion 48, also of U-shaped cross-section which is relatively smaller than the section 46. The dimensions of this nose section are such that it is adapted to enter one of the contact sockets 2, the end of this nose section being formed into a conical shape as shown at 50.

A tang or lance 52 is struck up from the intermediate section 46 to provide one stop for the pin when it is mounted in the pin header block (described below) and an additional stop 54 is struck up which is opposed to the stop 52. A contact tab 56 extends rearwardly from the end of the intermediate web portion and can be bent to an arcuate form as shown at 56′ (FIGURE 4) so that it will engage conducting paths 65 on the daughter board 64.

The pin header block 40 which is adapted to receive contact pins of the type shown at 44 has a plurality of cavities 42 extending therethrough, the spacing between these cavities corresponding to the spacing of the cavities in the receptacle block 26. This block has a central slot 62 on its upper side which extends for the entire length of the block and is adapted to receive the daughter board or card 64. The cavities 42 merge with this slot as best shown in FIGURE 5. Suitable stops in the form of shoulders as shown at 58 and 60 are provided for cooperation with the lance 52 and stop 54 of the pins to retain them in the cavities. The ends of the header block are provided with vertical slots 82 which are adapted to receive edge portions 80 of the daughter board.

In use, contact sockets and pins of the type shown may be employed to form connections between the individual circuit paths 29 on the underside of the mother board 28 and conducting paths 65 on the daughter boards 64. It will be understood that a relatively large number of daughter boards may be provided on a single mother board 28, the mother board functioning to provide the conductors between the groups of the electrical components mounted on the individual daughter boards. To form such conducting paths, a suitable number of connector blocks 26 are mounted on the mother board 28 with the post portions of the contact sockets extending through openings in the mother board, the openings in the mother board being a size sufficiently large to permit passage of the posts only therethrough. The projecting portions of the posts on the underside of the mother board will then be soldered to the individual conducting paths 29 on the mother board as shown at 25 in FIGURE 4.

Referring to FIGURE 1, in the disclosed embodiment, the receptacle blocks 26 are mounted on the mother board 28 by means of ears 70 on their ends through which suitable fasteners 72 extend. The pin header blocks 40 also have ears 74 on their ends. The pin header is secured to the daughter board by means of suitable fasteners 81 extending through these ears and the daughter board. This arrangement of mounting the daughter board on the header blocks 40 and particularly the provision of the slots 82 which receive portions of the daughter board is advantageous in that the possibility of breakage of the mounting ears is greatly reduced. The portions of the daughter board which extend into the slots 82 provide a substantial bearing area for any transverse stresses imposed by careless or abusive handling of the board as when the board is removed from the connector block 26.

An additional significant feature of the disclosed embodiment is the provision of tongue and groove means 76, 78 on the sides of the connector block 26 and the header block 40. As shown in FIGURE 7, the connector block 26 is provided with a tongue on one end and a groove at the other end for cooperation with a groove and tongue in depending legs 75 on the pin header block. This arrangement polarizes the header block 40 with respect to the receptacle block 26 and prevents damage to the contacts during insertion. Additionally, this tongue and groove arrangement provides lateral and longitudinal alignment of the two blocks 26, 40 and thereby prevents damage to the contacts during plugging and unplugging.

Figure 8:
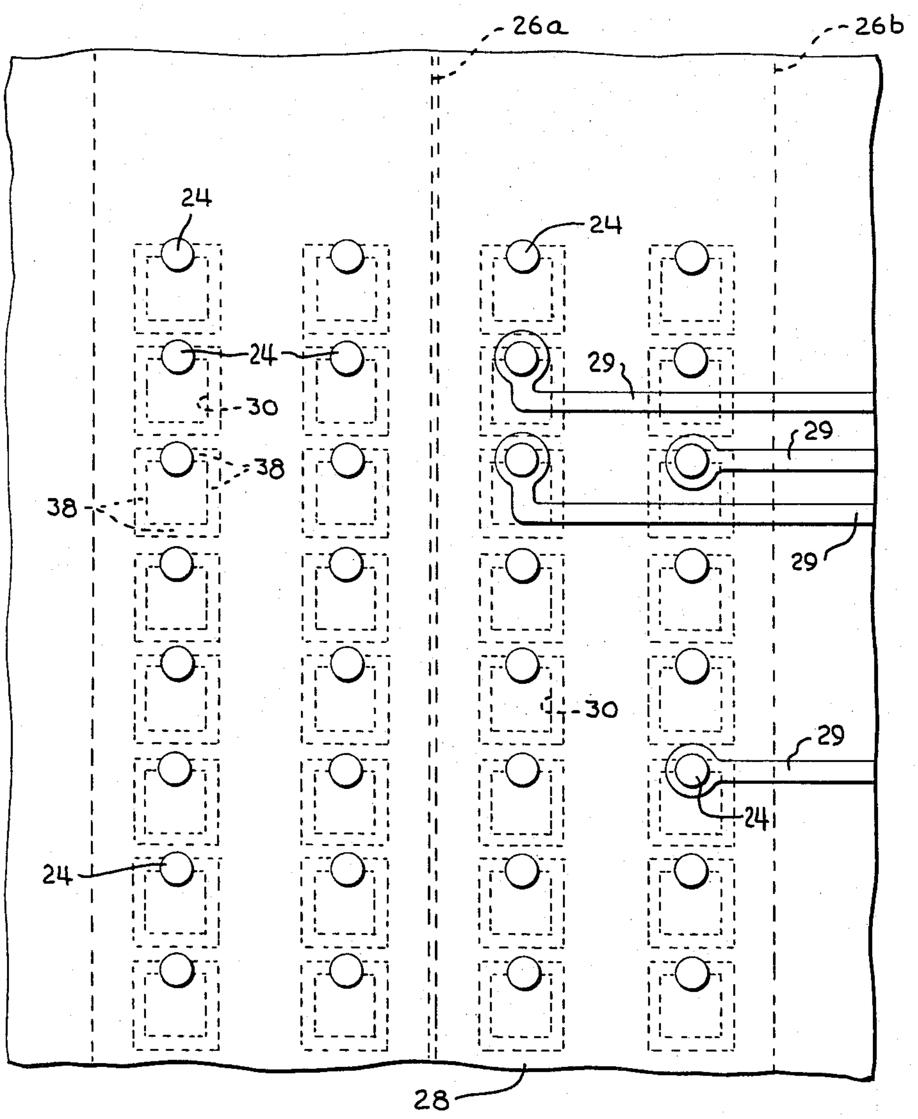
Figure 7:
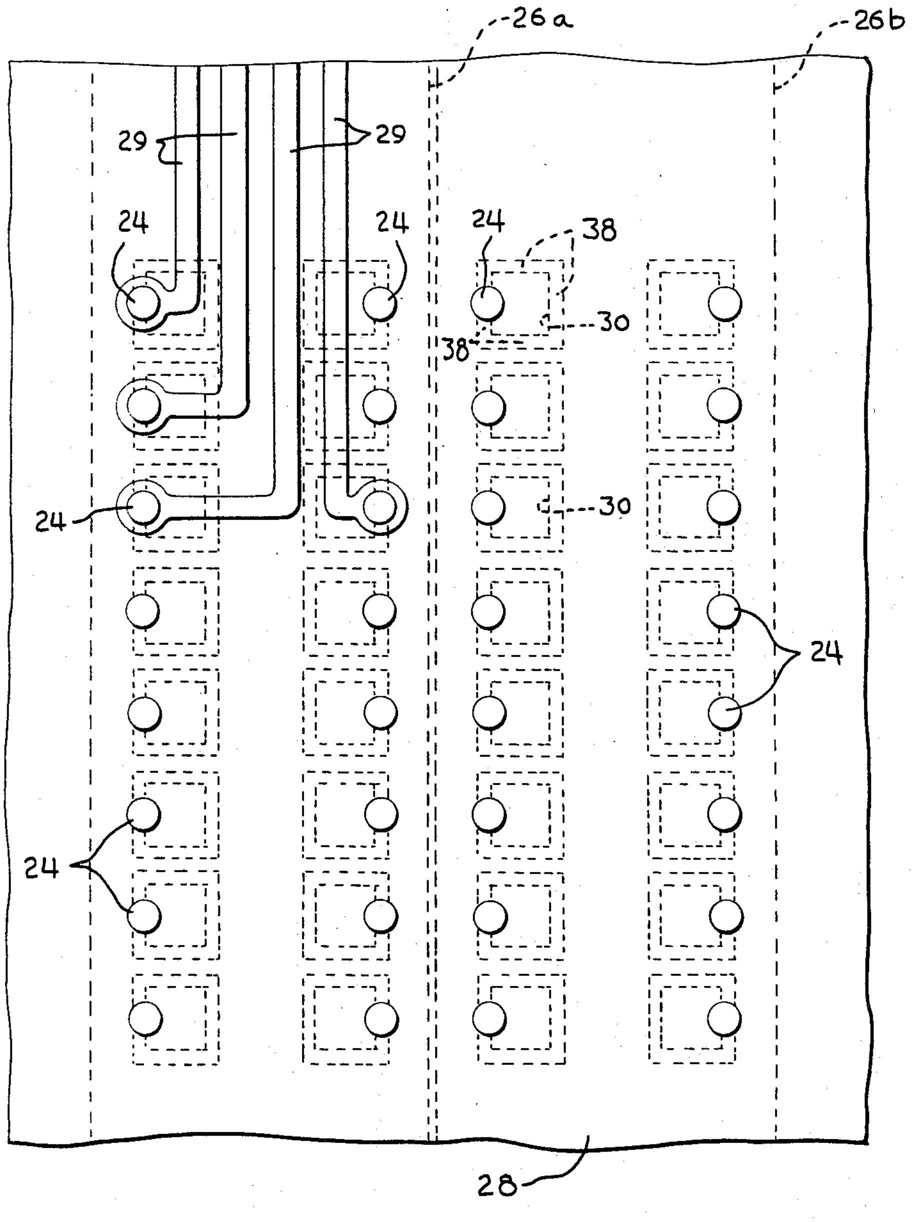

The individual cards or daughter boards 64 are mounted in the pin headers 40 and the contact portions or tails 56 of these pins are bent to an arcuate form 56′ and soldered to the conducting paths 65 on the daughter board. The header blocks can then be plugged into the appropriate receptacle blocks 26 to complete the electrical circuits. Individual daughter boards can, of course, be easily replaced if found defective.

Where it is desired to achieve maximum density of daughter boards on the mother board 28, a large number of conducting paths must be provided on the underside of the mother board. Since there is a practical limit to the closeness with which these conducting paths can be provided on the mother board, it is frequently desirable to arrange the posts 24 in something other than a simple rectangular grid pattern in order to provide well-defined passageways for groups of parallel conductors. As pointed out previously, the individual contact sockets can be inserted into the block 26 in any one of four orientations thereby to locate the posts in any one of four different positions. FIGURES 8–11 illustrate some alternative grid patterns which can be achieved in the practice of the invention. In FIGURE 8, all of the contact sockets in two adjacent blocks **26*a*, 26*b* have been inserted into their cavities in the same orientation. The resulting grid pattern defines a spacing between individual posts which is the same as the spacing between the centers of the cavities in the blocks 26*a*, 26*b***. FIGURE 8 thus represents a simple rectangular grid pattern which would be used where no unusual density problems are present.

Figure 10:
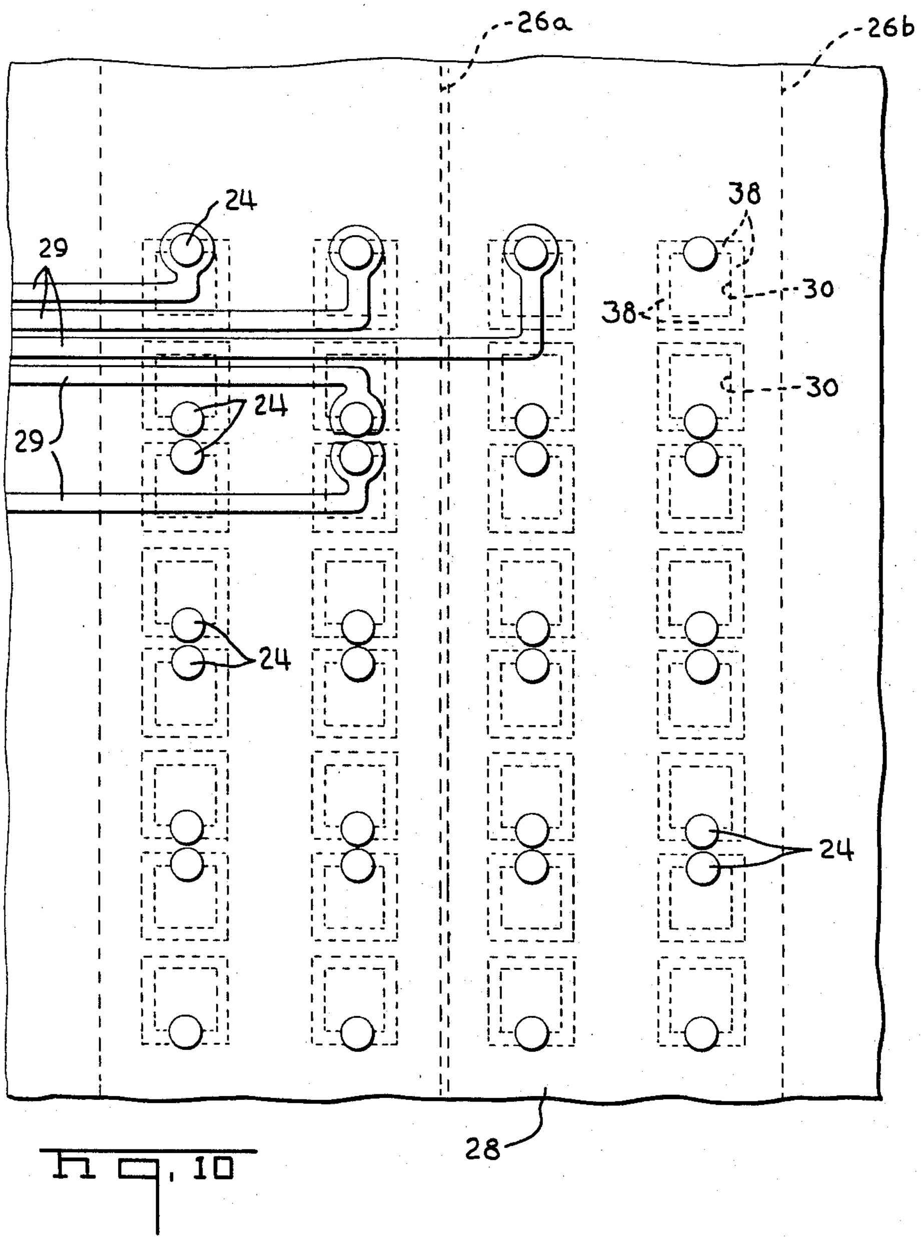
Figure 11:
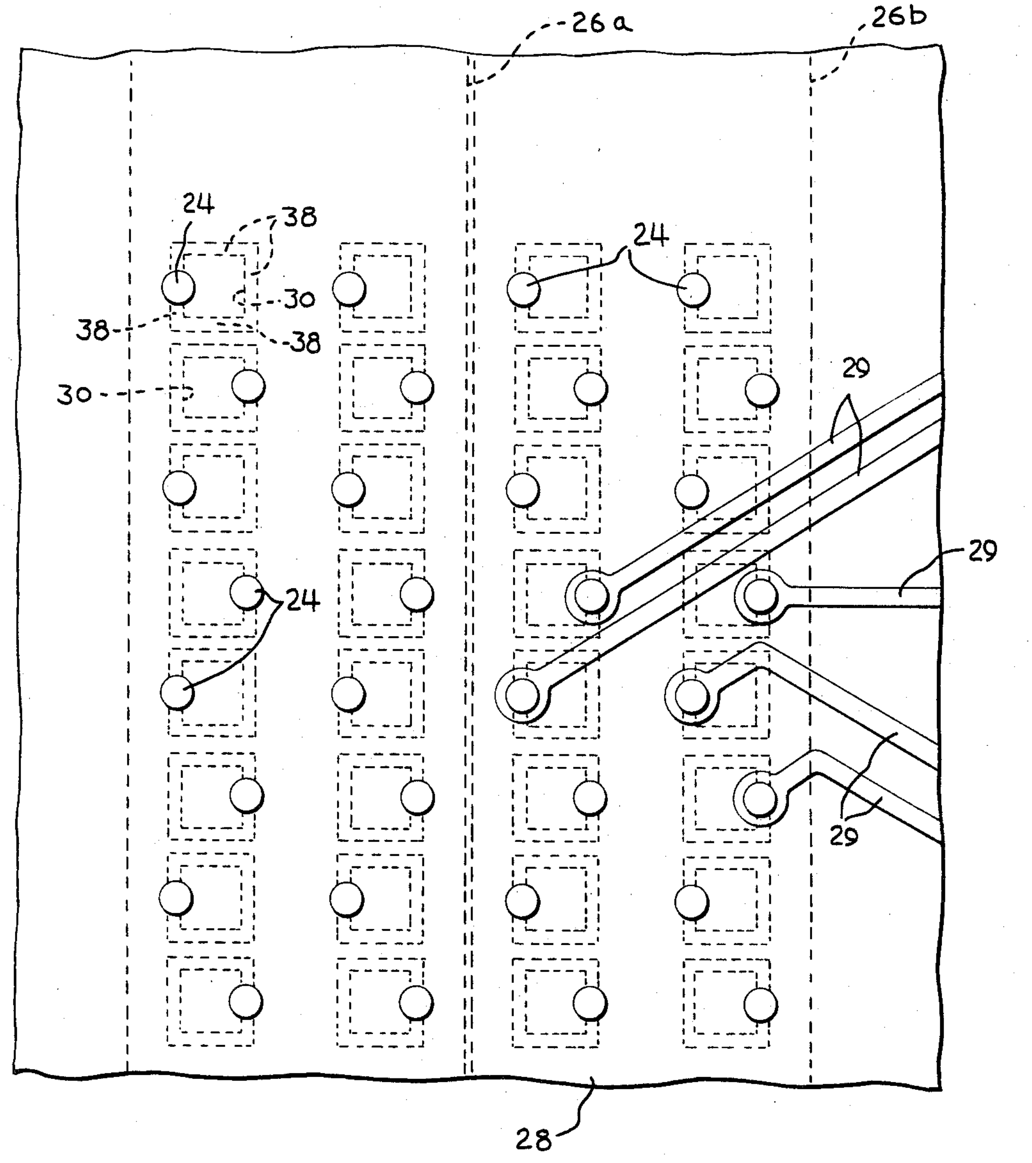

In FIGURE 9, the sockets 2 have been inserted in orientations such that the posts are on opposite sides of the opposed cavities in each connector. This arrangement gives a maximum spacing between posts of each receptacle in the horizontal direction, as viewed in FIGURE 9, so that relatively wide vertical passageways are provided between the posts of each receptacle for the printed circuit conductors. FIGURE 10 shows an arrangement in which each pair of adjacent contacts in the vertical rows of cavities are oriented such that the posts of each pair are close together and maximum spacing is provided between associated pairs of the posts in each vertical row. This arrangement thus provides relatively wide horizontally extending passageways, as viewed in FIGURE 10, for the accommodation of conducting paths. FIGURE 11 shows an arrangement in which adjacent contact sockets have been inserted in diametrically opposite orientations. This arrangement provides maximum spacing between adjacent posts (this spacing being substantially greater than the spacing between the adjacent cavities in the blocks) and well-defined diagonally extending passageways for groups of conductors.

Aside from the advantages of alternative spacing arrangements as described above, the disclosed form of contact socket has several additional advantages which contribute to its utility in the disclosed board-to-board connecting systems or in any other interconnection system. The individual contacts are retained in the cavities against downward movement, as viewed in FIGURE 4, by the ears 12, 14 and are retained against upward movement by the retaining lances 22. If an oversized probe is inserted into any of the cavities, it will not enter the socket for the reason that it will not be permitted to pass beyond the shoulders 36 and into the intermediate cavity portions 31. Any probe or pin which is of a size such that it can be inserted into the intermediate cavity portion cannot damage the springs 8 for the reason that even if they are flexed until they bear against the sidewalls of the cavities 30, the springs will not be overstressed. Furthermore, an off center pin (one which is not properly centered in its contact socket) may partially lose contact with one of the contact springs but will be engaged by a relatively higher pressure by the opposed contact spring and the remaining springs would continue to exert their normal pressure. When the individual pins enter the contact sockets, that is, when the header block 40 is engaged with the receptacle block 26, the pins will be guided into the sockets by the flange sections 12, 14. The arrangement of the four semi-elliptic springs in the socket permits the use of pins having any desired cross-section (i.e., round, polygonal). The only requirement of the pin is that it be of a size such that it will enter the socket and flex the springs.

Contacts and interconnection systems in accordance with the invention can be manufactured in extremely small sizes. For example, contacts 2 have been manufactured and used having an overall length of about 0.300 inch, the semi-elliptic springs being about 0.125 inch in length. This particular socket is used in a receptacle block having cavities spaced apart by 0.050 inch thus permitting a contact density of 400 contacts per square inch.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. An electrical contact socket comprising two spaced-apart, axially aligned square frame sections, four semi-elliptic springs, each of said springs being integral at its ends with a pair of corresponding sides of said frame sections, said springs being inwardly concave with respect to the axis of said socket, retaining ears extending from each side of the free end of one of said frame sections, said retaining ears each comprising a flange extending laterally from the associated side of said frame section and having an end portion extending axially away from said one frame section, three sides of the other one of said frame sections having axial extensions projecting from said other frame section, the center one of said extensions projecting beyond the other extensions and having a retaining lance struck therefrom, the remaining side of said other frame section having an inwardly directed leading edge to guide said socket into a cavity.

2. An electrical contact socket and housing therefor, said socket comprising two spaced apart, axially aligned square frame sections, four semi-elliptic springs, each of said springs being integral at its ends with a pair of corresponding sides of said frame sections, said springs being inwardly concave with respect to the axis of said socket, retaining ears extending from each side of the free end of one of said frame sections, said retaining ears each comprising a flange extending laterally from the associated side of said frame section and having an end portion extending axially away from said one frame section, said housing having a cavity having a square cross-section extending therethrough, said cavity being enlarged at one end, said contact socket being in said cavity and said ears being in the enlarged section of said cavity and preventing movement of said socket in one direction, and additional retaining means effective between said cavity and said contact preventing movement of said socket in the other direction.

3. A device as set forth in claim 2 wherein said additional retaining means comprises lance and shoulder means on said contact socket and in said cavity respectively.

4. Electrical connecting means comprising a plurality of contact sockets, each contact socket comprising, two spaced-apart generally rectangular frame sections, semi-elliptic springs integral at their ends with, and extending between said frame sections, said elliptic springs being concave inwardly towards the axis of said socket, a post member extending axially from one of said frame sections, said post member extending parallel to, and beside, the axis of said socket member, an insulating connector block having a plurality of closely spaced cavities extending therethrough, said cavities having a rectangular cross-section conforming to the cross-section of said frame sections, said sockets being insertable into said cavities in any one of four orientations whereby said post is located in one of four possible positions spaced around the axis of said cavity thereby to achieve different grid patterns of said posts, said insulating block being mounted on a mother board with said posts extending through said mother board, and interconnecting conductors extending among said posts.

5. Electrical connecting means as set forth in claim 4 including a header block mounted on said connector block, said header block having a daughter board mounted thereon, said header block containing a plurality of contact pins extending into said contact sockets, and said contact pins being electrically connected to conductors on said daughter board.

6. An electrical contact socket and housing therefor, said contact socket comprising two spaced-apart square frame sections, semi-elliptic springs integral at their ends, and extending between, said frame sections, said springs being inwardly bowed towards the axis of said pin, retaining ears extending from the free end of one of said frame sections, each of said retaining ears comprising a laterally extending flange, said flange having end portions extending parallel to the axis of said socket, the other one of said frame sections having an extension on one side thereof, a lance struck out from said extension, and a post extending from said extension, said post being parallel to, and beside, the axis of said socket, said housing having a cavity of square cross-section extending therethrough, said cavity being enlarged at each end to provide four outwardly facing shoulders, said socket being disposed in said cavity with said retaining ears disposed in one of said enlargements and with said lance disposed in the other one of said enlargements, said socket being retained in said cavity by said lance and said ears and said post extending beside the axis of said cavity.

References Cited

UNITED STATES PATENTS

| | | | |
|---|---|---|---|
| 3,146,051 | 8/1964 | Woofter et al. | 339—217 |
| 2,391,425 | 12/1945 | Korn | 339—256 |
| 2,935,725 | 5/1960 | Fox. | |
| 3,047,832 | 7/1962 | Deakin. | |
| 3,196,377 | 7/1965 | Minich. | |
| 3,287,686 | 11/1966 | Ruehlemann | 339—258 |
| 3,292,132 | 12/1966 | Murphy | 339—221 |

MARVIN A. CHAMPION, *Primary Examiner.*

R. S. STROBEL, *Assistant Examiner.*